Oct. 10, 1950   R. SELIGMAN ET AL   2,525,000
FILTER FOR PLATE-TYPE HEAT EXCHANGE APPARATUS
Filed Nov. 20, 1945   5 Sheets-Sheet 1

INVENTORS,
R. Seligman and
BY H. F. Goodman
ATTORNEYS

Oct. 10, 1950  R. SELIGMAN ET AL  2,525,000
FILTER FOR PLATE-TYPE HEAT EXCHANGE APPARATUS
Filed Nov. 20, 1945  5 Sheets-Sheet 2

INVENTORS
R. Seligman and
H. F. Goodman
BY
Young, Emery & Thompson
ATTORNEYS

Oct. 10, 1950   R. SELIGMAN ET AL   2,525,000
FILTER FOR PLATE-TYPE HEAT EXCHANGE APPARATUS
Filed Nov. 20, 1945   5 Sheets-Sheet 3
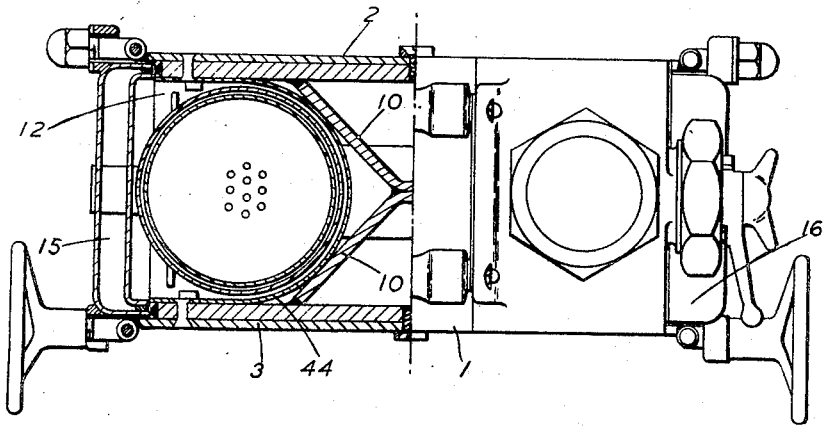
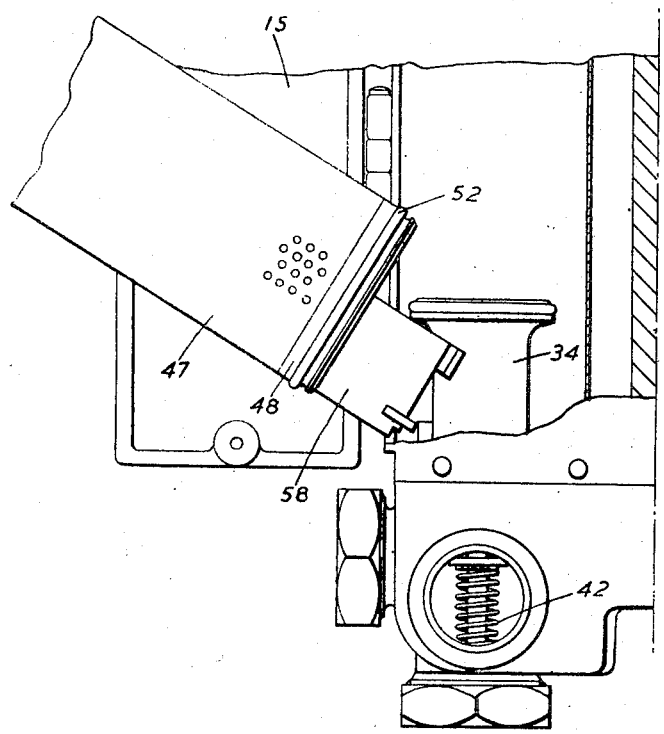
INVENTORS
R. Seligman and
H. F. Goodman
BY Young, Emery & Hooper
ATTORNEYS Oct. 10, 1950   R. SELIGMAN ET AL   2,525,000
FILTER FOR PLATE-TYPE HEAT EXCHANGE APPARATUS
Filed Nov. 20, 1945   5 Sheets-Sheet 4

INVENTORS
RICHARD SELIGMAN
HUGH F. GOODMAN
BY Young, Emery & Thompson
ATTORNEYS

Oct. 10, 1950 R. SELIGMAN ET AL 2,525,000
FILTER FOR PLATE-TYPE HEAT EXCHANGE APPARATUS
Filed Nov. 20, 1945 5 Sheets-Sheet 5

INVENTORS
RICHARD SELIGMAN
HUGH F. GOODMAN
BY
ATTORNEYS

Patented Oct. 10, 1950

2,525,000

UNITED STATES PATENT OFFICE 2,525,000

FILTER FOR PLATE-TYPE HEAT EXCHANGE APPARATUS

Richard Seligman and Hugh Frederick Goodman, Wandsworth, London, England, assignors to The Aluminium Plant & Vessel Company, Limited, London, England, a British company Application November 20, 1945, Serial No. 629,746
In Great Britain September 14, 1944

Section 1, Public Law 690, August 8, 1946
Patent expires September 14, 1964

1 Claim. (Cl. 210—154)

This invention relates to plate-type heat exchange apparatus of the type that is made up of a plurality of juxtaposed plates or elements arranged side by side to provide passages for the flow of the fluid media between which heat is to be exchanged and more particularly to filtering apparatus for incorporation in heat exchange apparatus of the type referred to.

It has been found that certain liquids such as milk filter much more quickly and satisfactorily when hot than when cold. For instance, hot milk will pass through a given cloth filter many more times faster than will the same milk while cold. Also, cold milk will often clog up a filter. In the handling and treating of milk in the pasteurizing thereof, the milk is brought in heat exchange relation with a heating medium after being passed in heat exchange relation with previously heated milk to cool the latter and preheat the former. Plate-type heat exchangers are widely employed for this purpose and according to the present invention, a filter is inserted in the stack of heat exchange plates to filter the liquid while it is in the portion of the stack of plates where it is hot.

One object of the invention is to provide an improved form of such a filtering apparatus for the filtering of milk and other potable liquids.

Another object of the invention is to provide an improved form of plate-type heat exchanger having such a filtering apparatus or unit incorporated therein.

According to one feature of the invention there is provided an improved form of filtering unit which is adapted for incorporation in a plate type heat exchanger and which comprises a pair of filtering elements or chambers so arranged that both of them may be used together or either of them may be in use whilst the other is disconnected from circuit for cleaning, inspection or other purposes.

According to another feature of the invention there is provided a plate-type heat exchanger having incorporated therein a filtering unit comprising a pair of filtering elements or chambers with which are associated means for enabling either to be disconnected from circuit as, for example, for cleaning or inspection.

In the preferred form of the invention, the improved form of filtering unit is constructed and formed so that it constitutes a self-contained unit which is adapted for incorporation in an assembly of plates forming part of a plate-type heat exchanger and is made up of two separate or separated filtering components or chambers arranged side by side or otherwise and provided with means for enabling the flow to be directed either through both of them or through either of them so that whilst one is in use the other may be examined or cleaned without interrupting or disturbing the operation of the other parts of the plant.

The filtering components may be of any desired form and each of them may be adapted to be connected with the flow line by suitable means such as one or more manually operable valves arranged in position in the inlet to, and/or the outlet from, the filtering unit.

In some instances, the filtering components may be in the form of elongated cylindrical members provided with stocking-like filtering elements or cloths which, if desired, may be provided with means for causing the same to assume a concertina-like or zig-zag form in cross section or to be provided with a re-entrant portion. The member supporting the filtering element or elements may be in the form of a perforated cylinder or two concentric cylinders.

It is to be understood that the filter may be disposed or inserted at any point in the heat exchanger so as to secure filtration at any temperature within the range of the machine and should, therefore, conform to the general structure of the machine.

In order that the said invention may be clearly understood and readily carried into effect, the same will now be more fully described with reference to the accompanying drawings in which:

Fig. 3 is a plan view partly in section; and

Fig. 4 is a fragmentary view showing the door of the unit open and one of the filtering components being swung outwardly through the opening for inspection, cleaning, fitting of another filter cloth or other purposes.

Figure 1:
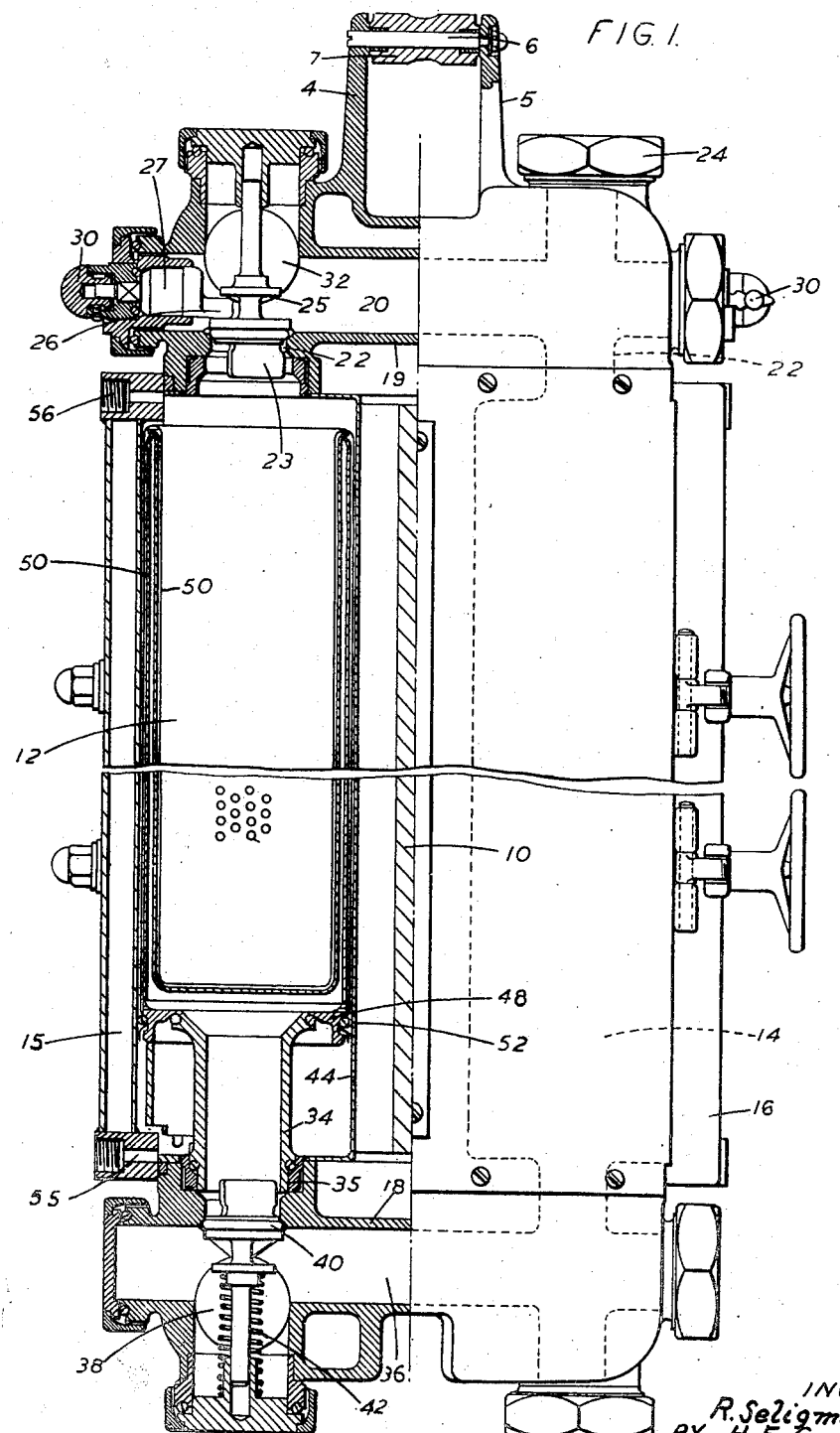
Fig. 1 is a side view, partly in section, of one form of the improved form of filtering unit produced according to the invention.
Figure 2:
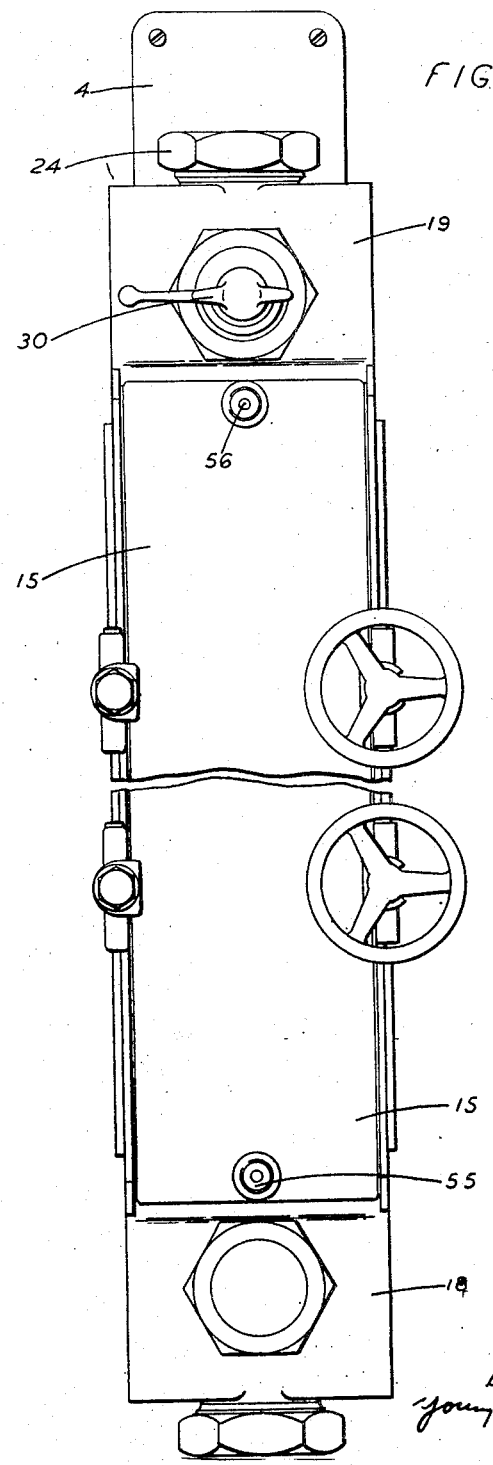
Fig. 2 is a side view of the same.
Figure 5:
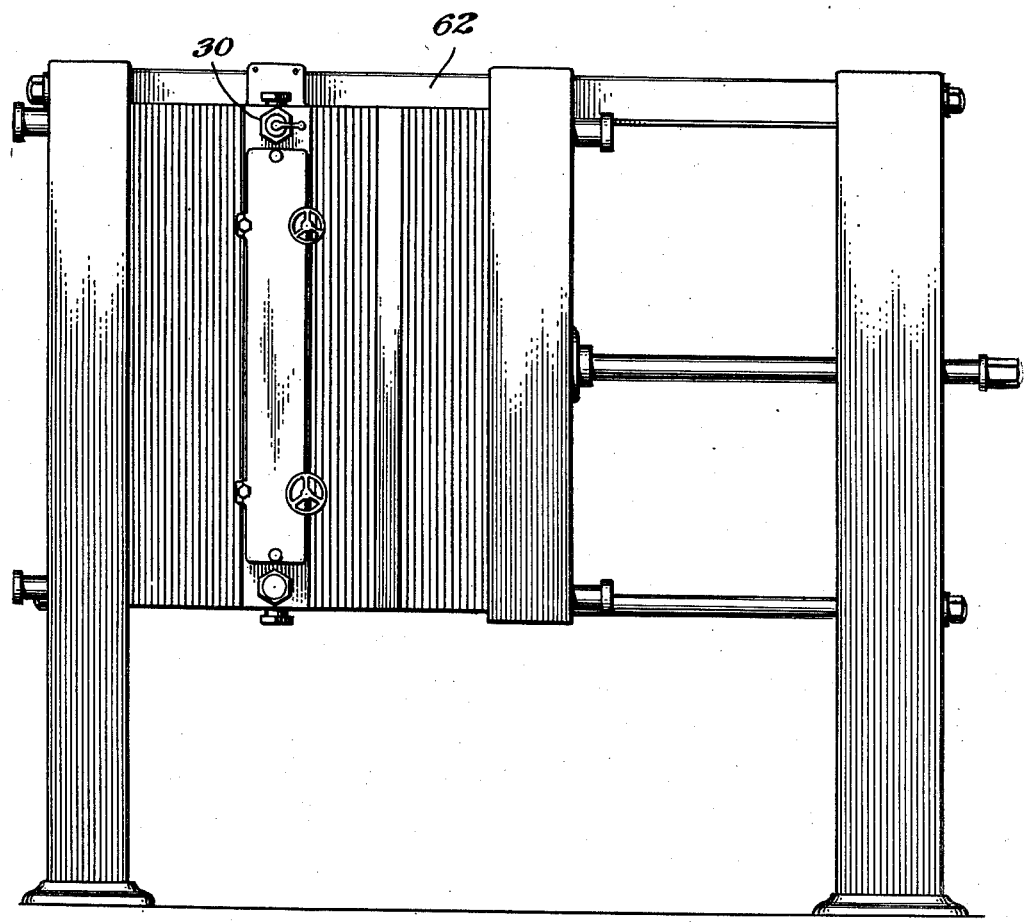
Fig. 5 is a side elevational view of a plate-type heat exchanger embodying the features of the present invention.
Figure 6:
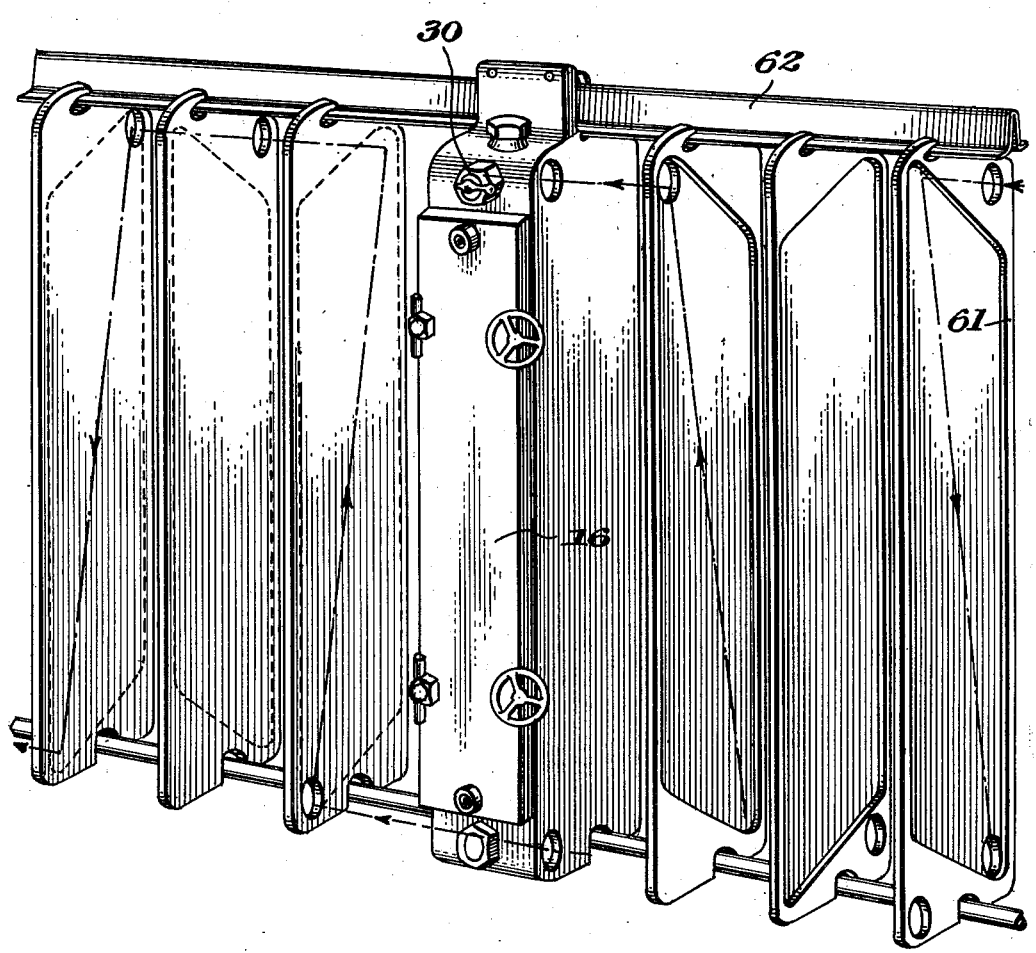
Fig. 6 is a fragmentary perspective exploded view of a heat exchanger including the features of the present invention.

The improved filter unit illustrated in the accompanying drawings comprises an outer casing 1 which is generally of rectangular form in cross section and is provided with side walls 2 and 3 which are parallel and substantially flat so that the unit may be incorporated or fitted in a stack of heat exchange plates 60a, 60b, 60c, etc., forming part of a plate-type heat exchanger 61 at a definite point where the inlet and outlet ports of the filter unit will properly register with the ports of adjacent heat exchange plates. At its upper end, the unit is formed with a pair of upwardly extending brackets 4 and 5 which are spaced apart and which serve to support pins 6 forming journals for rollers 7 by which the unit is supported for lateral displacement along an overhead bar 62 which also serves to support the heat exchanger plates 60. The unit is traversed by plates 10 in cruciform arrangement.

The casing contains two filtering chambers 12 and 14, the arrangement being such that the front of the chamber 12 is adapted to be closed by a double walled door 15 hinged at 15a and controllable by screw clamps 15b, while the front of the chamber 14 is adapted to be closed by another hinged door of like form shown at 16. At its lower end, the casing 1 is provided with a header block 18 in which are cast passages for the flow of the milk and, at its upper end, there is arranged another header block 19 also having passages cast therein, the latter block being provided with the aforesaid upwardly extending brackets 4 and 5 which carry the roller 7.

As will be seen, the block 19 is provided with a passage 20 which extends transversely thereacross above the filtering chambers and is connected with the upper ends of the said chambers by a pair of transfer ports 22 each having seated therein one of a pair of valves 23. The valves are provided with upwardly extending valve stems 23a arranged for movement in guides or caps 24 which are at a convenient point above the valve seats. Each valve is formed with a shoulder 25 engaged by one of a pair of pins or projections 26 which project eccentrically from the ends of a pair of horizontally arranged members or spindles 27 which are mounted for angular displacement in the opposite end walls of the block 19, the arrangement being such that each spindle is provided externally of the block with an operating handle or bar 30.

The milk to be filtered may enter from one section 60a of the heat exchanger, say, after pre-heating, through an inlet port 32 into the transverse passage 20 and by operating either or both of the handles or bars 30 to raise one or both of the valves 23 it may be permitted to pass into either or both of the filtering chambers. At its lower end each filtering chamber is provided with a vertically disposed tubular member 34, which tubular members are seated in a pair of vertical ports or openings 35 formed in the lower block 18 so that they communicate with a transverse passage 36 in such block. The passage 36 is connected with an outlet port 38 which is adapted to register with a port leading to a further section 60d of the heat exchanger and each of the ports 35 is provided with one of a pair of valves 40. Such valves are loaded by light springs 42 so that when the pressure in the filter chamber thereabove is released the valve will close and seal the chamber from the outlet passage.

Each filtering chamber is preferably provided with a semi-cylindrical or substantially semi-cylindrical liner 44 bearing against plates 10 (Fig. 3) to partition the casing therewith. The filtering elements within the filtering chambers preferably comprise a pair of concentric perforated tubes 46 and 47 which are spaced slightly and are arranged so that the outer tube 47 is coupled with a ring 48 which is seated in position on the upper flared end of the tubular member 34. The aforesaid tubes constitute the support for a filtering element or cloth 50 which extends over the outer surface of the outer tube 47 and along the inner surface of the inner tube 46. Preferably, the filtering cloth consists of an elongated bag or stocking-like member the open end of which is sealed or connected with the ring 48 by slipping thereover a resilient ring 52 and providing the ring 48 with an annular groove to receive said open end and resilient ring. As will be seen, the cloth extends upwardly from its open end over the outer surface of the outer tube and then downwardly along the inner surface of the inner tube and hence the liquid being filtered has to pass outwardly through one part of the filter cloth or inwardly through the other part of the filter cloth in order to pass into the annular space between the tubes 46 and 47 and thence to the outlet from the filtering chamber.

In practice, either or both filtering chambers may be used and either may be opened up for inspection, cleaning or the changing of the filter cloth without interrupting or disturbing the operation of the other parts of the plant providing, of course, that the valve operating member 30 is actuated to close the valve 23 at the upper end of the filtering chamber which is to be opened up.

When it is required to change a filter cloth the valve 23 at the upper end of the chamber containing the cloth is closed and the milk in the chamber is drained therefrom through a drainhole 55 which is normally closed by a plug. At the same time, a similar opening 56 at the top of the door allows the chamber to be vented and when the milk has drained away, the door may be opened to gain access to the filtering elements. Preferably and in order to facilitate the carrying out of the operation of removing the old or used filter cloth and fitting a new one, the filtering elements comprising the tubes 46 and 47, the cloth 50, the ring 48 and a support 58 therefor are adapted to be swung outwardly in the manner indicated in Fig. 4. For this purpose, the support 58 may be arranged so that it is free to pivot about its lower edge, and suitable stops are preferably provided to limit the degree of outward or pivotal movement permissible.

We claim:

A filtering unit comprising a vertically extending pair of side walls in spaced parallel relationship, a vertical door hinged to a wall edge at each end of the space bounded thereby, vertical partition-means traversing the gap between said walls to define in conjunction with said walls and doors a pair of vertical filtering chambers, a header-block extending horizontally over the upper ends of said chambers and having a passage connecting a fluid-inlet port common to said chambers and a pair of transfer-ports whereby fluid may be transferred to said chambers, a valve controlling flow of fluid through each of said transfer ports, externally-operable means for individual control of each of said valves, a header-block extending horizontally across the lower ends of said chambers and having a passage connecting said lower ends to an outlet port, and a filter element in each of said chambers of such size as to be removable through an end of the aforesaid space when a door is swung about its hinge.

RICHARD SELIGMAN.
HUGH FREDERICK GOODMAN.

(References on following page)

REFERENCES CITED

The following references are of record in the file of this patent:

UNITED STATES PATENTS

| Number | Name | Date |
|---|---|---|
| 1,181,729 | Brown | May 2, 1916 |
| 1,383,547 | Konsalik | July 5, 1921 |
| 1,503,846 | Piette | Aug. 5, 1924 |
| 1,568,001 | Seligman | Dec. 29, 1925 |
| 1,652,173 | Lalor | Dec. 13, 1927 |
| 1,656,455 | Tinello | Jan. 17, 1928 |
| 1,696,735 | Scoville | Dec. 25, 1928 |
| 1,794,768 | Hatch | Mar. 3, 1931 |
| 1,866,970 | Garland et al. | July 12, 1932 |
| 1,874,054 | Levinsen | Aug. 30, 1932 |
| 1,885,762 | Polushkin | Nov. 1, 1932 |
| 2,292,107 | Beck | Aug. 25, 1942 |
| 2,300,849 | Tauch | Nov. 3, 1942 |
| 2,333,609 | Widmann | Nov. 2, 1943 |
| 2,365,074 | Harvout | Dec. 12, 1944 |

FOREIGN PATENTS

| Number | Country | Date |
|---|---|---|
| 9,421 | France | of 1908 |
| 192,009 | Great Britain | of 1923 |